United States Patent [19]
Campbell

[11] Patent Number: 5,564,881
[45] Date of Patent: Oct. 15, 1996

[54] BAR CLEANER FOR TRASH BAG BREAKER

[75] Inventor: Raymond W. Campbell, Beloit, Wis.

[73] Assignee: Beloit Technologies, Inc., Wilmington, Del.

[21] Appl. No.: 382,743

[22] Filed: Feb. 2, 1995

[51] Int. Cl.⁶ .................................................. B65G 65/04
[52] U.S. Cl. ........................... 414/412; 198/693; 241/167; 241/200
[58] Field of Search .................................... 414/412, 417; 198/693; 241/166, 167, 200, 38

[56] References Cited

U.S. PATENT DOCUMENTS

| | | | |
|---|---|---|---|
| 77,102 | 4/1868 | Rymes . | |
| 1,448,013 | 3/1923 | Warren | 241/200 |
| 2,152,393 | 3/1939 | Turner | 198/693 |
| 3,116,718 | 1/1964 | Krupotich et al. | 414/412 |
| 3,134,482 | 5/1964 | Knothe | 198/693 |
| 3,341,899 | 8/1964 | Marriner . | |
| 3,627,098 | 12/1971 | Lorenz | 198/693 |
| 3,682,396 | 8/1972 | Whitney et al. | 241/166 |
| 3,891,105 | 6/1975 | Cerroni . | |
| 4,067,506 | 1/1978 | Cerroni . | |
| 4,078,683 | 3/1978 | Hansen | 414/417 |
| 4,119,227 | 10/1978 | Hafner et al. . | |
| 4,171,045 | 10/1979 | Lapeyre . | |
| 4,274,787 | 6/1981 | Mueller et al. | 414/412 |
| 4,341,353 | 7/1982 | Hamilton et al. . | |
| 4,479,581 | 10/1984 | Kelyman, Jr. . | |
| 4,566,641 | 1/1986 | Okamoto et al. . | |
| 4,610,545 | 9/1986 | Tomlinson . | |
| 4,740,129 | 4/1988 | Sponseller | 198/693 |
| 4,798,508 | 1/1989 | Lewis . | |
| 4,846,975 | 7/1989 | Kelyman . | |
| 5,188,500 | 2/1993 | Eide et al. . | |
| 5,197,587 | 3/1993 | Malmberg | 198/497 |
| 5,269,474 | 12/1993 | Reis et al. . | |
| 5,282,713 | 2/1994 | Lande . | |
| 5,368,432 | 11/1994 | Schoenhard . | |
| 5,415,515 | 5/1995 | Bielagus et al. . | |

FOREIGN PATENT DOCUMENTS

| | | |
|---|---|---|
| 0563002 | 9/1993 | European Pat. Off. . |
| 1432564 | 11/1964 | France . |
| 2307634 | 4/1976 | France . |
| 1297550 | 6/1969 | Germany . |
| 2556044 | 6/1976 | Germany . |
| 0556176 | 1/1980 | Japan . |
| 61-33644 | 2/1986 | Japan . |
| 8303265 | 9/1983 | Netherlands . |
| 0628035 | 10/1978 | U.S.S.R. . |
| 1013356 | 7/1980 | U.S.S.R. . |
| 0825379 | 4/1981 | U.S.S.R. . |
| 1535305 | 12/1978 | United Kingdom . |
| 2062497 | 11/1979 | United Kingdom . |

Primary Examiner—David A. Bucci
Assistant Examiner—Thomas J. Brahan
Attorney, Agent, or Firm—Dirk J. Veneman; Raymond W. Campbell

[57] ABSTRACT

A multiplicity of teeth are mounted to a beam in a comb structure, with the space between the teeth defining slots. The edges of the slots are lined with upstanding flanges which are sharpened to form cutting edges. The comb structure is arranged to be substantially parallel to an array of bag breaking bars. The bars interdigitate with the teeth and thus pass through the narrow openings between the teeth where the knife edges scrape the bars, thereby cutting free any material adhering to or impaled upon the bag breaking bars. Alternatively, an apparatus for cleaning a bag breaker has a pivotally mounted arc having a fork which is aligned to receive a bar between the tines of the fork. The fork engages the base of the bar and then proceeds to slide up the bar as the forward motion of the bar causes the arm to pivot. In this way, material impaled upon a bar is slid or scraped upwardly towards the top of the bar. When the fork reaches the top of the bar and has thus removed any material impaled upon the bar, it pivots in response to an attached spring back to its initial position wherein it engages the next bar in sequence.

5 Claims, 2 Drawing Sheets

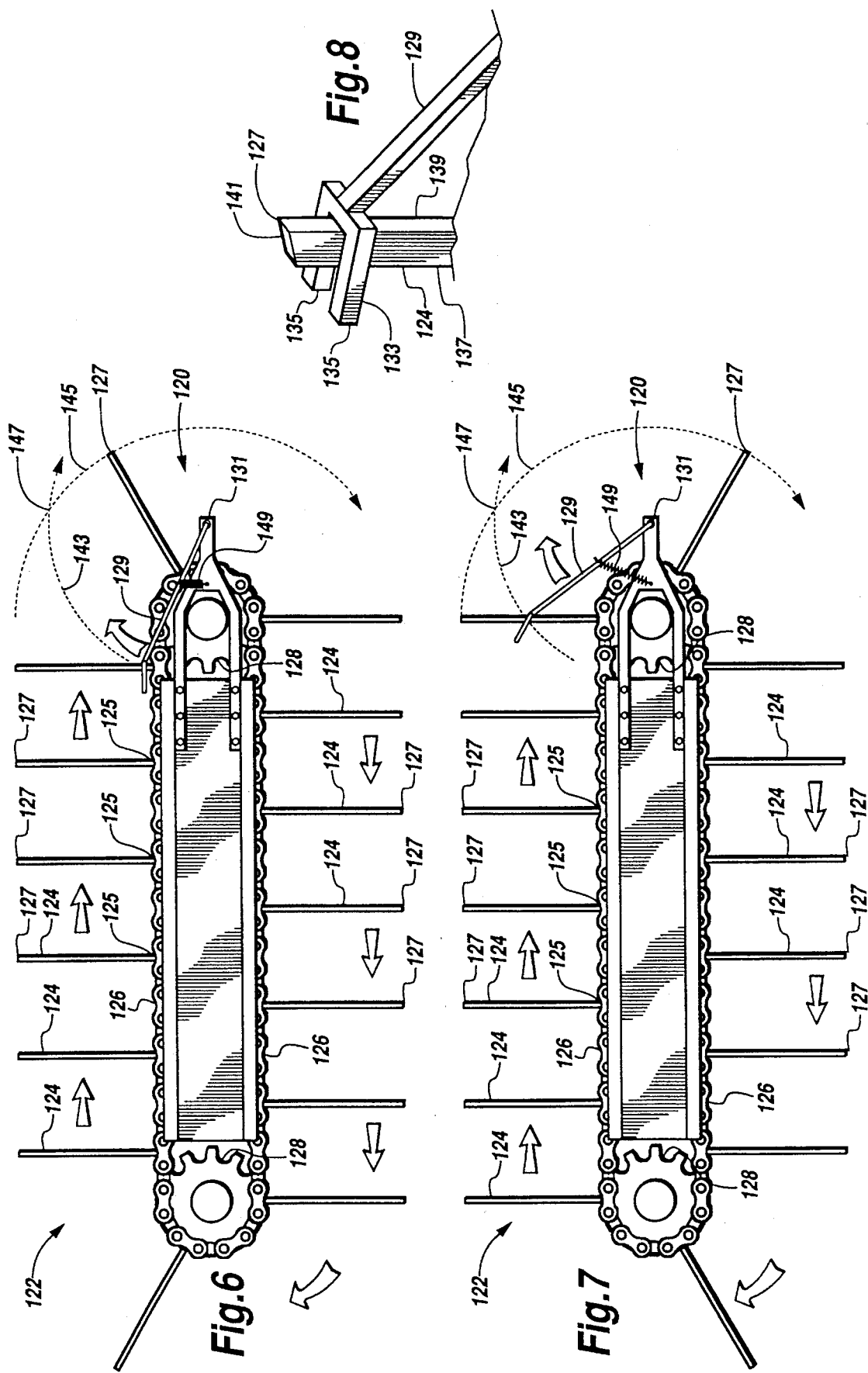

BAR CLEANER FOR TRASH BAG BREAKER

FIELD OF THE INVENTION

The present invention relates generally to municipal waste processing systems and more particularly to an apparatus for opening garbage bags.

BACKGROUND OF THE INVENTION

Refuse from individuals and businesses is often placed in plastic garbage bags for disposal. Such bags are used by consumers when the weekly accumulation of trash exceeds the space available in the one or two trash containers typically owned by a suburban dweller. In other instances, for persons who are not on a garbage route, the trash must be transported to a waste facility. In such circumstances, a per bag fee may be charged for dumping and thus trash bags will be the normal method of delivery of the trash. Transporting trash in trash bags is more secure than in trash cans as they cannot tip over. Further, the trash is sealed within the bag and there is no need to transport the sometimes soiled and smelly trash containers back from the disposal site. In yet other circumstances, municipal plans for recycling may require that certain types of recyclable materials such as aluminum cans, plastic bottles and glass bottles be placed in a clear plastic bag for identification and collection.

For proper functioning in the collection and handling of refuse, a plastic garbage bag needs to be burst and tear resistant. If the bag is easily burst or torn, the bag may spill its contents before reaching the waste disposal site. The premature breaking of a garbage bag often results in the wind disposal of large quantities of litter. If a bag bursts while being transported, the car or truck transporting the bag may become soiled and the owner of the bag may be subject to considerable penalties for littering along the highway.

When municipalities were allowed to landfill the entire volume of collected municipal waste, the high tear or burst resistance of garbage bags was of little or no concern. However, where efforts are made to recycle substantial portions of the municipal waste stream, it is necessary to open the garbage bags in order to separate out the constituents of the trash. This is particularly essential when the plastic bags contain only recyclable materials as a part of a program to segregate recyclable trash in specially designated plastic bags.

To deal with the difficulty of opening garbage bags, a number of devices have been developed. A device for opening garbage bags employs a multiplicity of bars or tines which are mounted on chains or belts and traverse an endless path about spaced apart sprockets or rollers. The bars are arrayed to penetrate the trash bag with adjacent and/or opposed bars being driven at different speeds to rip the trash bags apart.

Such bag bursting apparatuses are relatively effective. However, the bars which are used to penetrate the bags will not infrequently also penetrate or impale one or more items of garbage, for example, an aluminum can or plastic bottle. Even shreds of plastic bag which become wound around or impaled upon the bars can, as material builds up over time, impede the function of the bag opener or even cause it to jam. When the bars become sufficiently burdened with wastes, the unit must be shut down and the bars cleaned by hand. This can be a time consuming and dirty job.

What is needed is an apparatus for cleaning the bars on a bag breaker.

SUMMARY OF THE INVENTION

The bag breaker bar cleaners of this invention are of two types. The first type employs a comb structure in which a multiplicity of teeth are mounted to a beam. The spaces between the teeth define slots. The edges of the slots are lined with upstanding flanges which are sharpened to form cutting edges. The comb structure is arranged to be substantially parallel to an array of bag breaking bars which traverse a closed loop. The bars arrayed on the plurality of parallel chain drives interdigitate with the teeth. When the bars pass through the narrow openings between the comb teeth, the knife edges scrape opposed surfaces of the bars and cut free any material adhering to or impaled upon the bag breaking bars.

The second embodiment of the apparatus for cleaning the bars of a bag breaking apparatus of this invention is an arm pivotally mounted at a point fixed with respect to the endless loop formed by a chain on which bars are mounted. A fork two or more tines is mounted on the arm and is aligned to receive a bar between its tines. The fork engages the base of the bar and then proceeds to slide up the bar as the forward motion of the bar on the chain causes the arm to pivot about its pivot point. In this way, material impaled upon a bar is slid or scraped upwardly towards the top of the bar. When the fork reaches the top of the bar and has thus removed any material impaled upon the bar, it pivots in response to an attached spring back to its initial position wherein it engages the next bar in sequence.

It is a feature of the present invention to provide an apparatus for cleaning the bars of a trash bag breaker.

It is another feature of the present invention to provide an apparatus which shears material which has become impaled or entangled with the bars of a trash bag breaker.

It is a further feature of the present invention to provide an apparatus for cleaning the bars of a trash bag breaker which slides material impaled or entangled with the bars off the bars.

Further objects, features and advantages of the invention will be apparent from the following detailed description when taken in conjunction with the accompanying drawings.

BRIEF DESCRIPTION OF THE DRAWINGS

FIG. 6 is an illustrative side-elevational view of an alternative bag breaker bar cleaner of this invention.

FIG. 7 is a side-elevational view similar to FIG. 6 wherein the sliding progression of the cleaner fork along the bag breaker bar is illustrated.

FIG. 8 is an enlarged fragmentary isometric view of the bag breaker fork of FIG. 6 sliding along a bag breaker bar.

DESCRIPTION OF THE PREFERRED EMBODIMENTS

Figure 1:
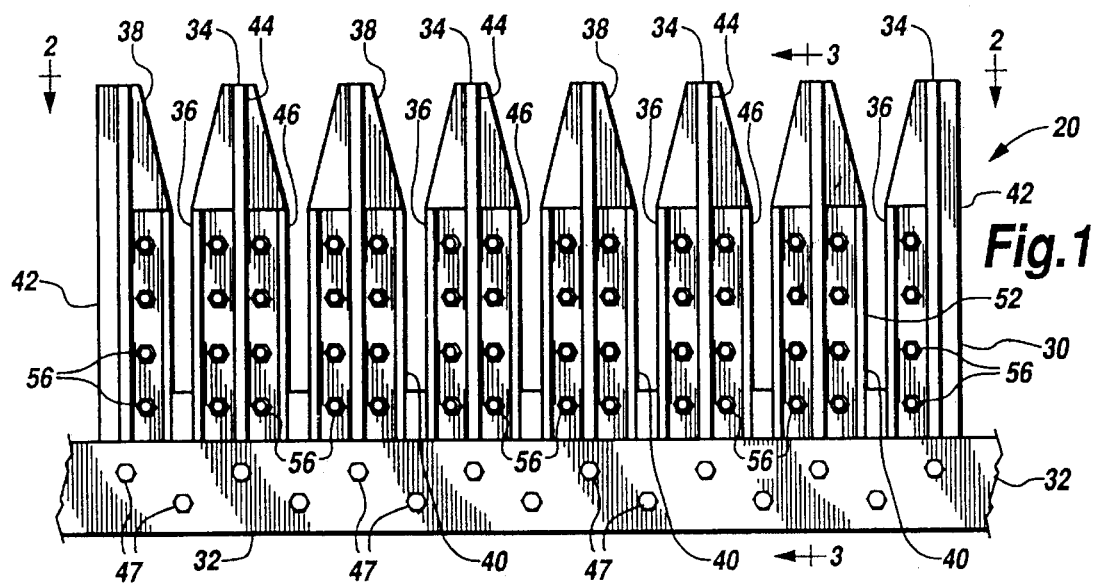
FIG. 1 is a top plan view of a bag breaker bar cleaner of the present invention.
Figure 2:
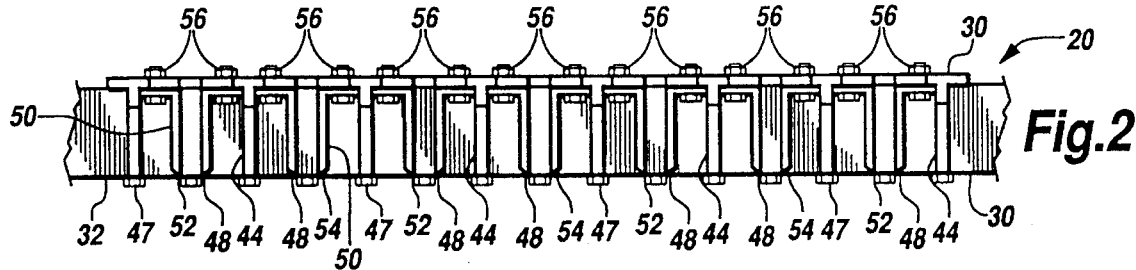
FIG. 2 is an end elevational view of the bar cleaner of FIG. 1 taken along line 2—2
Figure 3:
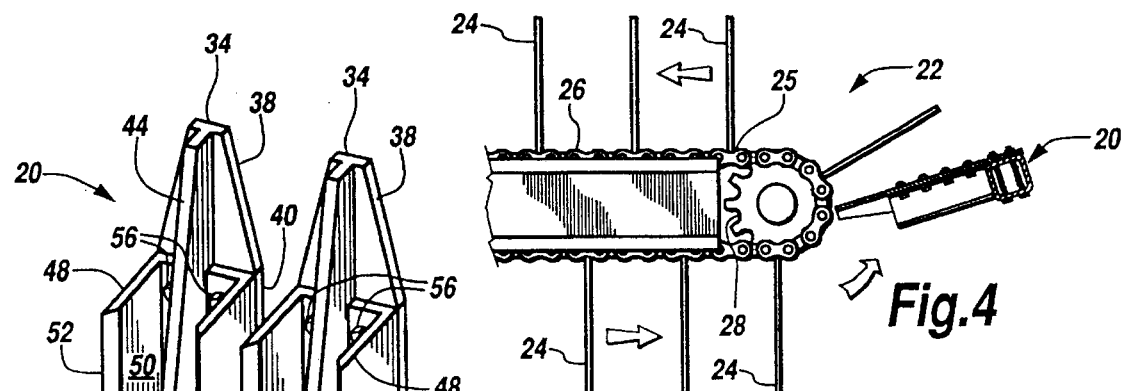
FIG. 3 is a cross-sectional view of the bar cleaner of FIG. 1 taken along section line 3—3.

Referring more particularly to FIGS. 1–8, wherein like numbers refer to similar parts, a bag breaker bar cleaner 20 is shown in FIGS. 1–3.

Figure 4:
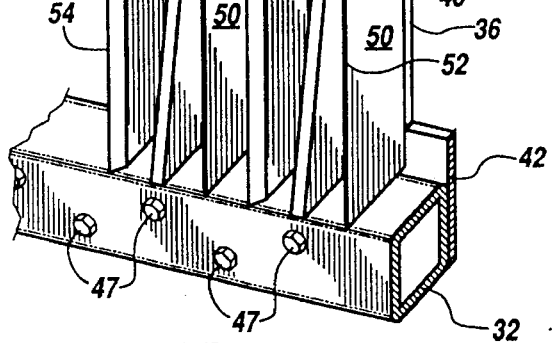
FIG. 4 is a schematic view showing how the bar cleaner of FIG. 1 may be positioned to clean the bars of a bag breaker apparatus.
Figure 5:
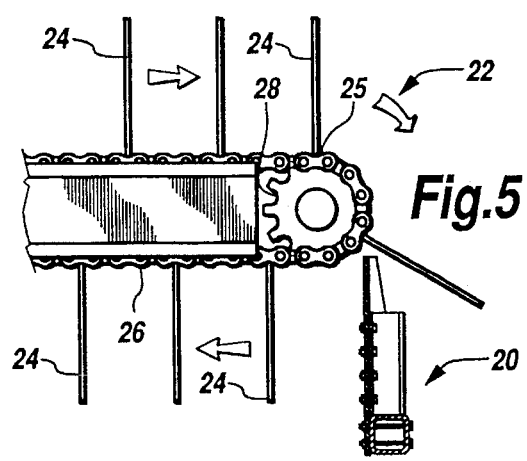
FIG. 5 is a schematic view showing an alternative positioning of the bar cleaner of FIG. 1 for cleaning the bars of a bag breaker apparatus.

Bag breakers 22 such as those shown in FIGS. 4 and 5 typically employ bars 24 which are mounted to an endless chain 26 which traverses a closed loop about one or more sprockets 28. While bag breakers come in a number of configurations, those employing bars typically use the bars to impale or penetrate bags of trash. The parallel rows of adjacent bars (not shown) are driven at different speeds so that when the trash bag is impaled by two or more bars moving at different speeds, the bag containing the trash is torn open.

As the bars 24 rotate around a sprocket, as shown in FIGS. 4 and 5, the bars reverse direction, going from pointing up to pointing down or vice versa. This inversion of the bars can be used to cause the bars to penetrate or impale bags of trash. The bars are typically designed to be sufficiently sharp so as to penetrate the trash bags but have blunted tops, as shown in FIG. 8, so as to avoid impaling or penetrating individual items of trash. However, invariably, items of trash become impaled upon or wrapped around the bars 24.

A bar cleaner 20 may be employed to automatically clean the bars. As shown in FIG. 1, the bar cleaner 20 has a comb-shaped structure 30 which has a support beam 32 which supports the bar cleaner 20 approximately perpendicular to the direction of motion of the bag breaker 22. The bar cleaner has a multiplicity of teeth 34. Each tooth 34 has a rectangular portion 36 and a tapered section 38. Adjacent rectangular portions 36 define slots 40 which are sized to narrowly pass bars 24.

The teeth 34 are cut from a plate 42 and are stiffened by gussets 44 which are welded to the plate 42. The plate 42 is bolted to the beam 32 by bolts 47. Each gusset 44 stiffens a tooth 34. Mounted on either side of the gusset 44 and aligned with the edges 46 of the slots 40 are right-angle cutting flanges 48. The cutting flanges have upstanding legs 50 which terminate in a cutting edge 52 which is part of a blade surface 54. Thus the sides 46 of the slots 40 have sharp edges 52 which shear material off the bars 24 as they interdigitate with the teeth 34 passing through the slots 40. The tapered portions 38 of the teeth 34 help to center the bars 24 and guide them into the slots 40.

Because the support beam 32 will often form part of the structure of the bag breaker 22, the plate 42 is releasably bolted by bolts 47 to the beam 32. The cutting flanges 48 are removably attached to the teeth 34 by bolts 56. The cutting flanges 48 may require periodic removal for replacement or sharpening and this is facilitated by the bolts 56 which allow the disassembly and removal of the cutting flanges 48 from the teeth 34.

As the bars 24 traverse about the sprockets 28 on the endless chain 26, they sweep out a closed volume. The cleaner assembly 20 is designed to bracket and surround this closed volume with sharp edges which shear off any material which has increased the width of the bars 24 by adhering thereto. As shown in FIGS. 4 and 5, depending on the direction of rotation of the chain about the sprocket, the placement of the bar cleaner assembly 20 will vary so that the bars travel into the sharpened edges 52 and so that the material sheared from the bars readily falls clear of the bag breaker 22 and the bar cleaner 20. The bar cleaner 20 will be angled downwardly, as shown in FIG. 4 to cleans bars which are traveling upwardly, and will be angled upwardly, as shown in FIG. 5, to clean bars which are traveling downwardly.

It should be understood that the bar cleaner 20 should be positioned with respect to the bars 24 so that the bars engage with the base 25 first. The base passes between opposed tapered portions 38 of the teeth 34. In this way the tapered portions center the bars in the slots 40. The cutting flanges 48 create a shearing action with the sides of the bars similar to a pair of scissors which shears off the material adhering to the bars 24.

An alternative embodiment bag breaker bar cleaner assembly 120 is shown in FIGS. 6–8 mounted to a bag breaker 122. The bar cleaner 120 cleans the bag breaker bars 124 by sliding material from the bar base 125 to the bar top 127. This sliding action is accomplished by a plurality of pivotable arms, the number of which will depend on the number of rows of bag breaking bars employed in a particular apparatus. Each arm 129 pivots about a pivot axis 131. The pivot axis 131 is fixed with respect to the path traversed by the bars 124. The arm 129 supports a fork 133 which is formed at the end of the arm opposite the pivot axis 131. The fork 133 has two tines 135 which define a U-shape.

In an initial position, shown in FIG. 6, the fork 133 is engaged at the bottom 125 of the bar 124. The fork, as shown in FIG. 8, engages three sides 137, 139 and 141 of the bar 124. As shown in FIG. 6, the arm 129 rotates about the pivot axis 131 so that the fork 133 follows a circular path 143. The bar top 127 follows a curved path 145 as it turns around the sprocket 128 as shown in FIG. 6. Motion of the chain 126 carries the bars 124 around the sprockets 128.

Where a bar 124 becomes engaged with a fork 133 of the arm 129, the forward motion of the bar 124 causes a fork 133 to slide up the bar 124 from the base 125 to the top 127. As shown in FIGS. 6 and 7, where the path 143 of the fork and the path 145 of the bar tips intersect at a point 147, the arm 133 passes over the top 127 of the bar, whereupon a spring 149 causes the arm to return to its initial position as shown in FIG. 6 where it causes the next bar in sequence to be scraped.

It should be understood that the bar cleaners 20 and 120 may be employed with bag breaking apparatus of varying configurations.

It should also be understood, for purposes of this application, the endless chain referred to as 26, 126 is defined to include such structures as a plate conveyor, a conventional conveyor belt or other types of belts on which bars 24 may be mounted and caused to follow an endless path about one or more sprockets. It being further understood that the term sprockets includes pulleys, rolls, or wheels about which an endless chain moves.

Again, it should be understood that the bag breaking apparatus may be configured with one, two, three or more sprockets over which the endless chain moves. It should be understood that the bag breaking apparatus 22 and 122 illustrated in FIGS. 4, 5, 6 and 7 illustrate only a portion of the bag breaking apparatus and that normally a number of chains with bars will be arrayed in spaced parallel relation with alternate chains and bars moving at varying speeds so that when a bag of trash is impaled by two adjacent bars moving at different speeds, the bag will be torn open.

It is understood that the invention is not limited to the particular construction and arrangement of parts herein illustrated and described, but embraces such modified forms thereof as come within the scope of the following claims.

We claim:

1. In a trash bag breaker having an endless closed loop chain rotatable about at least one sprocket, a plurality of bars with bases mounted to the chain, the bars having sides and a top, the bars extending outwardly of the loop and perpendicular to the chain for breaking open trash bags, the improvement comprising an apparatus for cleaning said bars, comprising:

an arm pivotally mounted to a first point, wherein the arm pivots substantially in a plane defined by the loop;

a two pronged fork mounted to the arm, the fork being sized so the prongs closely engage the sides of the bars, wherein the arm is biased to a first position in which the fork prongs align to engage the base of a bar of the plurality of bars as it progresses about the loop, and wherein the fork is slidable along the bar as the arm pivots about the pivot; and wherein the arm is pivotal to a second position at which the fork slides off the top of the bar and is biased to the first position.

2. The apparatus of claim 1 wherein the chain rotates about at least two sprockets and the chain moves about the sprocket defining portions of the loop which are straight and portions which are curved about the sprocket and wherein the bar transits at least a part of a curved portion while the fork is sliding along the bar.

3. The apparatus of claim 1 wherein a spring is attached to the arm and a fixed point spaced from the pivot axis of the arm, and wherein the spring biases the arm to the first position.

4. The apparatus of claim 1 wherein the arm is mounted to pivot about an axis which is fixed with respect to the loop.

5. The apparatus of claim 4 wherein a spring extends between the arm and a point fixed with respect to the loop, and wherein the spring biases the arm to the first position.

* * * * *